US008892964B2

(12) United States Patent
Young et al.

(10) Patent No.: US 8,892,964 B2
(45) Date of Patent: *Nov. 18, 2014

(54) METHODS AND APPARATUS FOR MANAGING ASYNCHRONOUS DEPENDENT I/O FOR A VIRTUAL FIBRE CHANNEL TARGET

(71) Applicant: NetApp, Inc., Sunnyvale, CA (US)

(72) Inventors: Howard Young, Thousand Oaks, CA (US); Srinivasa Nagaraja Rao, Oak Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,822

(22) Filed: Jun. 28, 2013

(65) Prior Publication Data
US 2013/0290664 A1 Oct. 31, 2013

Related U.S. Application Data

(63) Continuation of application No. 12/761,452, filed on Apr. 16, 2010, now Pat. No. 8,489,940.

(51) Int. Cl.
*G06F 11/00* (2006.01)
*G06F 3/06* (2006.01)
*G06F 12/02* (2006.01)

(52) U.S. Cl.
CPC .......... *G06F 12/0223* (2013.01); *G06F 3/0659* (2013.01); *G06F 3/0664* (2013.01); *G06F 3/0689* (2013.01); *G06F 3/0613* (2013.01)
USPC .................. 714/54; 714/6.1; 714/6.2; 714/42

(58) Field of Classification Search
USPC ............ 714/6.1, 6.2, 6.21, 6.22, 6.23, 42, 54; 710/5; 711/154, 170, 203
See application file for complete search history.

(56) References Cited

U.S. PATENT DOCUMENTS

| | | | |
|---|---|---|---|
| 6,880,040 B2 | 4/2005 | Basham et al. | |
| 6,880,062 B1 | 4/2005 | Ibrahim et al. | |
| 7,127,549 B2 | 10/2006 | Sinclair | |
| 7,281,169 B2 | 10/2007 | Golasky et al. | |
| 7,827,251 B2 | 11/2010 | Kamisetty et al. | |
| 7,864,758 B1 * | 1/2011 | Lolayekar et al. | ............ 711/203 |
| 7,912,051 B1 * | 3/2011 | Rowlands et al. | ............ 370/389 |
| 8,046,548 B1 | 10/2011 | Chatterjee et al. | |
| 2002/0152338 A1 * | 10/2002 | Elliott et al. | .................... 710/34 |
| 2005/0188239 A1 * | 8/2005 | Golasky et al. | .................. 714/2 |
| 2005/0262309 A1 | 11/2005 | Frey et al. | |

* cited by examiner

Primary Examiner — Joseph D Manoskey
(74) Attorney, Agent, or Firm — Haynes and Boone, LLP

(57) ABSTRACT

A system and method for arbitrating exchange identifier assignments for I/O operations are disclosed. In an exemplary embodiment, the method comprises receiving, by a storage system, a data command from a host system. The data command is directed to a virtual device of the storage system, the virtual device comprising a plurality of physical devices of the storage system. A range of exchange identifier values are allocated to the data command. The range may include a predefined number of exchange identifiers, the predefined number determined prior to the receiving of the data command. A plurality of I/O operations corresponding to the data command are issued, where each of the plurality of I/O operations is directed to a physical device of the plurality of physical devices of the storage system. An exchange identifier within the range of exchange identifier values is associated with each of the plurality of I/O operations.

20 Claims, 6 Drawing Sheets

METHODS AND APPARATUS FOR MANAGING ASYNCHRONOUS DEPENDENT I/O FOR A VIRTUAL FIBRE CHANNEL TARGET

RELATED PATENTS

This patent is a continuation of U.S. Ser. No. 12/761,452 filed Apr. 16, 2010, now U.S. Pat. No. 8,489,940, and entitled "METHODS AND APPARATUS FOR MANAGING ASYNCHRONOUS DEPENDENT I/O FOR A VIRTUAL FIBRE CHANNEL TARGET" and is related to commonly owned U.S. Ser. No. 12/761,270 filed Apr. 15, 2010 and entitled "METHODS AND APPARATUS FOR CUT-THROUGH CACHE MANAGEMENT FOR A MIRRORED VIRTUAL VOLUME OF A VIRTUALIZED STORAGE SYSTEM," the entire disclosure of each of which is incorporated herein by reference in its entirety.

BACKGROUND

1. Field of the Invention

The invention relates generally to Fibre Channel (FC) systems and more specifically relates to improved methods and apparatus for managing virtual FC targets using multiple, asynchronous dependent physical I/O transactions.

2. Discussion of Related Art

It is generally known for storage subsystems to provide a layer of virtualization that hides the physical characteristics of underlying storage devices from attached host systems. For example, RAID storage management techniques may define a logical volume distributed over multiple physical disk drives (e.g., "striped" and/or "mirrored") while presenting a single logical unit (e.g., logical volume or virtual volume) to attached host systems. RAID storage management controller devices associated with the disk drives perform the logical/virtual to physical mapping to permit access to the storage capacity.

In the context of virtualized storage using Fibre Channel (FC) communications, a Data Path Manager (DPM) module may cooperate with a Storage Virtualization Manager (SVM) to provide the desired mapping from a virtual FC target (e.g., a logical volume or virtual volume) to one or more physical FC target devices (e.g., portions of one or more physical disk drives). In such a context, a host initiated read or write command is communicated over the Fibre Channel fabric to a DPM which, in turn, produces a virtual to physical I/O command tree used to issue one or more commands to appropriate physical FC target devices. In such DPM/SVM Fibre Channel environments, a typical translation from the virtual I/O request to corresponding physical I/O may generate a simple, single I/O operation to a single physical target device or may generate multiple physical I/O operations to multiple physical target devices.

In accordance with Fibre Channel standards, an exchange identifier (XID) is associated with the each of the one or more physical I/O operations to associate the operations with the original host initiated read or write command. Where a host initiated read or write command results in multiple physical I/O operations, the exchange ID for each such physical I/O operation is typically allocated from a pool of available X ID values. The multiple X ID values allocated for the multiple physical I/O operations are then associated with one another so that the DPM can determine when all physical I/O operations corresponding to a virtual FC target read or write have completed. Further, when all of the multiple physical I/O operations completed, all associated XID values for a given virtual FC target read or write command can be released for re-use.

Where multiple physical I/O operations are issued in a sequential manner (each subsequent operation waiting for a preceding operation to complete), each X ID may be allocated as needed in sequence from the pool of available X ID values. One of the allocated X ID values (e.g., the first or the last) is then used in the FC response sent back to the requesting host system. Management of the multiple X ID values where the corresponding multiple physical I/O operations are issued in a sequential manner often uses a queue structure (e.g., linked list data structure) to maintain the pool of available X ID values. A similar list structure may be used to associate the multiple XID values associated with a single virtual target read or write command.

In some storage management subsystems, such as RAID level 1 (mirrored) RAID level 5 (striped), data may be more effectively processed by issuing multiple parallel I/O operations to the multiple physical FC target devices corresponding to the virtual FC target addressed by the host initiated read or write command. The multiple physical I/O operations are considered "dependent" in that all must complete in some manner to complete the underlying request directed to the virtual FC target. Although such parallel I/O operations are favored for optimal performance, in the context of virtual Fibre Channel targets, the multiple exchange ID values utilized for the dependent, multiple physical I/O operations must be carefully managed because the multiple parallel I/O operations may be completed asynchronously with respect to the one another. In other words, a first physical I/O operation may be directed to a first physical target utilizing a first exchange ID in the Fibre Channel media and a second physical I/O operation may be directed to a second physical target utilizing a second exchange ID in the Fibre Channel media. However, the second physical I/O operation may complete before the first physical I/O operation due to the asynchronous nature of the parallel operation of the multiple physical targets. The exchange ID corresponding to the second I/O operation (the first physical operation to complete) may generate confusion and complexity in determining the ultimate status of each of the multiple physical I/O operations corresponding to the host initiated read or write command. Complex logic and data structures may be required to determine which exchange IDs are related to the same underlying virtual target operation. This added complexity may be reflected in additional memory accesses to manage the list structures associated with the available X_ID pool and/or with the list structures associating the multiple allocated X_ID values related to a single read/write command to a virtual target.

Thus, it is an ongoing challenge to manage asynchronous dependent I/O in the context of a virtual Fibre Channel target and more specifically an ongoing challenge to manage the exchange ID values utilized where multiple physical I/O operations are performed substantially in parallel responsive to a host initiated read or write command directed to a virtual Fibre Channel target.

SUMMARY

The present invention solves the above and other problems, thereby advancing the state of the useful arts, by providing methods and apparatus for managing exchange IDs for multiple asynchronous dependent I/O operations generated for virtual Fibre Channel (FC) target volumes. Features and aspects hereof allocate a range of sequential exchange ID values to be used for the multiple, asynchronous, dependent I/O operations directed to multiple physical FC targets of a virtual FC target. A primary X_ID is selected from the range of allocated X_ID values for communications with the attached host system that generated the original request to the virtual FC target volume.

In one aspect hereof, a method is provided operable in a virtualized storage system utilizing Fibre Channel (FC) communications. The storage system comprising a plurality of physical FC target devices. The method comprises receiving a read or write command over an FC communication medium from an attached host system. The read or write command is directed to a virtual FC target that comprises multiple physical FC target devices. The method also comprises allocating a range of sequential exchange identifier (X_ID) values responsive to receipt of the read or write command. The method then includes issuing multiple physical I/O operations, each physical I/O operation directed to a corresponding one of the multiple physical FC target devices. Each of the multiple physical I/O operations is associated with a corresponding X_ID value of the range of sequential X_ID values. The method also selects a primary X_ID (RX_ID) value based on the X_ID value associated with a first completed physical I/O operation of the multiple physical I/O operations and transmits a response to the host system indicating success or failure of the read or write command based on the completion of the multiple physical I/O operations. The response transmitted to host system utilizes the RX_ID. The method then releases the allocated range of sequential X_ID values responsive to transmitting the response to the host system.

Another aspect hereof provides apparatus in storage controller of a virtualized storage system. The system comprising a virtual Fibre Channel (FC) target that comprises a plurality of physical FC target devices. The apparatus comprises a virtual I/O processor coupled with the plurality of physical FC target devices. The virtual I/O processor adapted to receive a host initiated read or write command directed to the virtual FC target and adapted to allocate a range of sequential exchange ID (X_ID) values in response to receipt of the read or write command. The virtual I/O processor further adapted to issue multiple physical I/O operations to the plurality of physical FC target devices where each physical I/O operation includes a corresponding X_ID from the range of sequential X_ID values. The apparatus further comprises a primary exchange selection component coupled with the virtual I/O processor and coupled with the plurality of physical FC target devices. The primary exchange selection component adapted to select a primary X_ID (RX_ID) value based on the X_ID value associated with a first completed physical I/O operation of the multiple physical I/O operations. The apparatus further comprises an I/O completion component coupled with the virtual I/O processor and coupled with the plurality of physical FC target devices. The I/O completion component adapted to determine success or failure of the read or write command based on the completion of the multiple physical I/O operations and further adapted to communicate the success or failure to the virtual I/O processor. The virtual I/O processor further adapted to transmit a response to the host system indicating success or failure of the read or write responsive to the communication from the I/O completion component wherein the response transmitted to the host system utilizes the RX_ID. The virtual I/O processor further adapted to release the allocated range of sequential X_ID values responsive to transmitting the response to the host system.

Still another aspect hereof provides a method operable in virtualized Fibre Channel (FC) storage controller. The controller adapted to couple with one or more host systems and adapted to couple with a plurality of physical FC target devices. The method comprises defining, within the storage controller, a plurality of ranges of exchange identifier (X_ID) values wherein each range comprises a number (N) of sequential X_ID values. The method also comprises receiving from a host system a read or write command directed to a virtual FC target. The virtual FC target comprising a portion of each of the plurality of physical FC target devices. The method also comprises allocating, responsive to receipt of the command, a selected range from the plurality of ranges and issuing multiple physical I/O operations. Each physical I/O operation directed to a corresponding one of the plurality of physical FC target devices. Each of the multiple physical I/O operations is associated with a corresponding X_ID value of the allocated range. The method then communicates with the host system to complete processing of the command wherein the communication with the host system comprises a primary X_ID value selected from the allocated range. The method then releases the allocated range responsive to completing processing of the command.

DETAILED DESCRIPTION OF THE DRAWINGS

Figure 1:
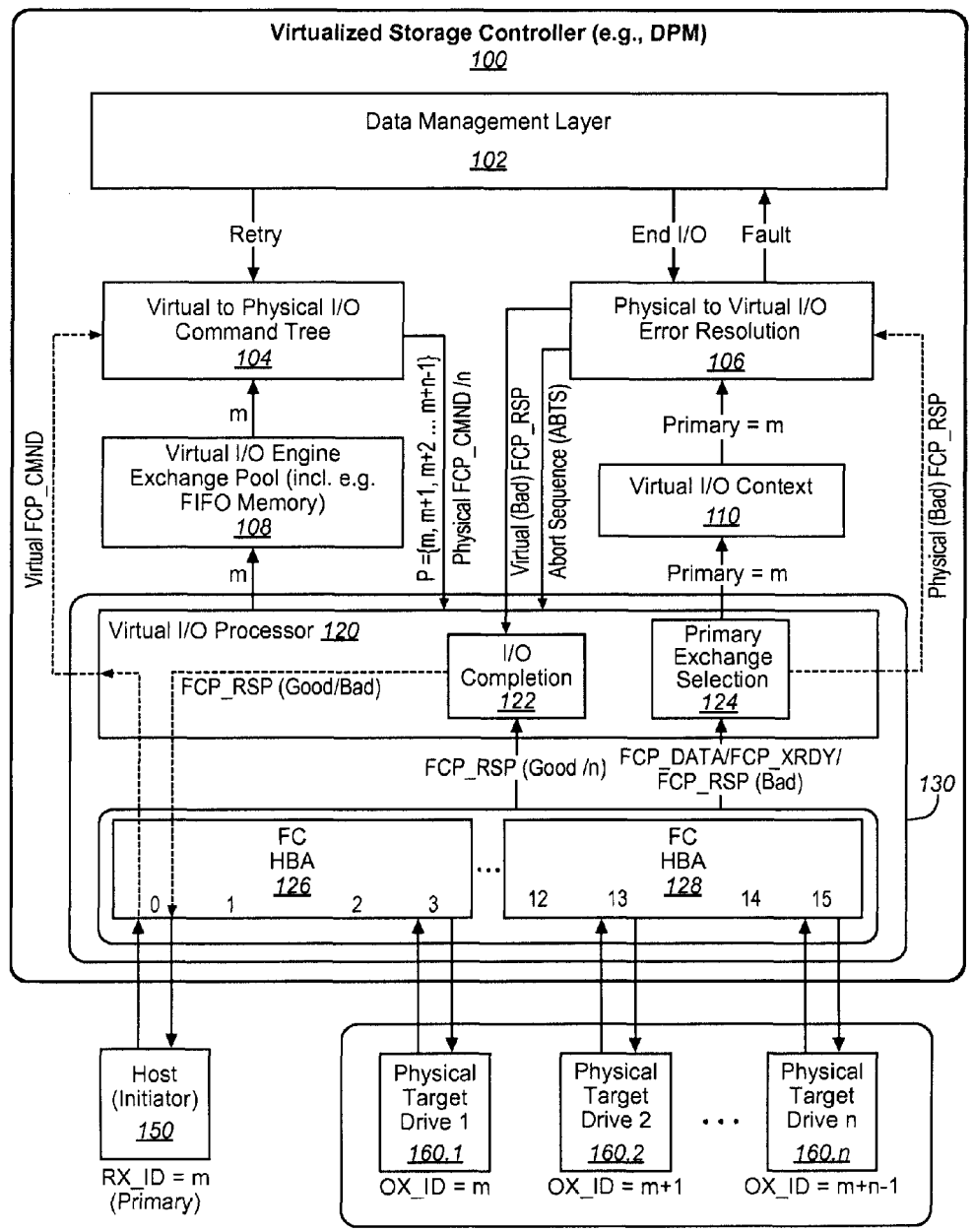
FIG. 1 is a block diagram of an exemplary virtualized FC storage controller enhanced in accordance with features and aspects hereof to improve management of exchange IDs used to associate multiple, asynchronous, dependent physical I/O operations associated with a virtual FC target.

FIG. 1 is a block diagram of a virtualized storage controller 100 enhanced in accordance with features and aspects hereof to provide improved management of Fibre Channel exchange IDs when utilizing asynchronous, dependent, physical I/O operations. Virtualized storage controller 100 is sometimes referred to as a Data Path Manager (DPM) as exemplified by commercialized products such as the 8400 DPM produced and sold by LSI Corporation. Controller 100 receives and processes I/O requests directed to storage volumes defined and managed by the controller 100. Virtualized storage controller 100 includes a data management layer 102 responsible for defining virtual volumes as configured by an administrative user utilizing a Storage Virtualization Management (SVM) application program (not shown). The data management layer 102 is involved at the highest level for I/O requests in the sense that it maintains mapping information used to map logical addresses associated with defining a virtual volume into corresponding physical addresses on physical FC target devices (e.g., physical target drives 160.1 through 160.N.). Devices 160.1 through 160.N may be any devices adapted to serve as FC target devices including, for example storage devices and in particular disk drives.

Virtualized storage controller 100, as a matter of design choice, may include a mixture of custom circuit components ("hardware") and software components (stored in a computer readable medium and executed by a suitable processor—not shown) for processing I/O requests received from one or more host systems 150. For example, elements 102 through 110 (discussed further below) may be implemented as software components. Customized circuits 130 are adapted to perform the lower-level I/O operations enhance the performance of the DPM in processing read and write commands. Such a design may be referred to as a "split-path" design in that some operations may be performed primarily by dedicated hardware—e.g., customized circuits—while other operations may be performed by some combination of software functions and hardware functions.

Customized circuits 130 may include a virtual I/O processor 120 adapted to receive I/O requests from host (initiator) 150 directed to a virtual volume stored on physical target drives 160.1 through 160.N. Host 150 may be a computing device or any other device adapted to initiate requests for access to a virtual FC target device. Virtual I/O processor 120 interacts with software components 102 through 110 to determine whether the received host request may be rapidly processed primarily within the virtual I/O processor 120 or rather requires intervention and interaction by the various software components of the virtualized storage controller 100. Virtual I/O processor 120 is sometimes referred to as a "fast path" of virtualized storage controller 100 in that many I/O requests (e.g., read and write commands) received from host 150 may be processed essentially entirely by the virtual I/O processor 120 without requiring intervention by the various software components of the virtualized storage controller 100.

Virtual I/O processor 120 is coupled with one or more FC host bus adapters (HBAs 126 and 128) for coupling the virtual virtualized storage controller 100 with a plurality of storage devices (e.g., physical target drives 160.1 through 160.N). Each FC host bus adapter 126 and 128 provides a plurality of Fibre Channel ports for coupling to Fibre Channel devices including initiator devices (e.g., host 150) and target devices (e.g., physical target drives 160.1 through 160.N). Those of ordinary skill in the art will readily recognize that any number of such FC HBAs may be provided in virtualized storage controller 100 each providing any desired number of FC ports for coupling to virtually any number of initiator devices and target devices.

In operation, virtual I/O processor 120 receives an I/O request from an initiator (e.g., host 150) and determines whether the FC target addressed by the received I/O request represents a physical FC target (i.e., a specific physical FC target device) or a virtual FC target (i.e., a virtual volume that maps to portions of one or more physical FC target devices). Where the I/O request is directed to a specific physical FC target, standard processing within virtual I/O processor 120 and virtualized storage controller 100 processes the request in accordance with standard Fibre Channel protocols and logic. However, where virtual I/O processor 120 determines that an I/O request is directed to a virtual FC target, virtual I/O processor 120 interacts with software components 102 through 110 of virtualized storage controller 100 to obtain information used by virtual I/O processor 120 to complete the received I/O request. In particular, virtual I/O processor 120 first allocates a range of FC exchange IDs by interaction with the virtual I/O engine exchange pool 108. Exchange pool 108 may include a memory, such as a FIFO memory, to implement a queue structure of available ranges of exchange IDs. During initialization of virtualized storage controller 100, a plurality of such predefined ranges may be determined and an entry added to the queue structure indicating each such range as presently available for allocation. Each range defines a sequential series of available exchange IDs starting from a first exchange ID (M) and extending through a predefined number (N) of sequential IDs (M through M+N−1).

Having so allocated one of the available ranges, virtual I/O processor 120 interacts with virtual to physical I/O command tree 104 to obtain access to a logical to physical mapping structure. The command tree module 104 may again comprise a suitable memory and associated logic that provides a mapping structure in response to decoding of the virtual FC target address identified in the received I/O request. The mapping information so retrieved by virtual I/O processor 120 is then utilized to generate a plurality of physical I/O operations. Each physical I/O operation is addressed to a physical location of a corresponding physical FC target device (e.g., physical target drives 160.1 through 160.N). Each of the multiple physical I/O operations utilizes a corresponding one of the multiple exchange IDs in the allocated range of FC exchange IDs. For example, the originator exchange ID (OX ID) for a physical I/O operation directed at physical target drives 160.1 may utilize the first exchange ID of the allocated range (M). The physical I/O operations directed at each of the subsequent physical target devices (160.2 through 160.N) utilize OX ID values corresponding to sequential next exchange IDs of the allocated range (e.g., M+1, M+2, etc. through M+N−1).

Since the multiple physical I/O operations may be performed substantially in parallel by the corresponding physical target devices 160.1 through 160.N, virtual I/O processor 120 includes logic to coordinate the responses from each of the multiple physical target devices to provide a single response to the requesting host 150. In particular, virtual I/O processor 120 may include I/O completion module 122 adapted to determine whether a success or failure response should be sent to the requesting host 150 based on responses from the plurality of physical FC target devices 160.1 through 160.N. If all physical FC target devices 160.1 through 160.N return a successful status for their respective physical I/O operations, I/O completion module 122 returns a good (successful) response to the requesting host 150. Responses other than successful completion including, for example, an FCP DATA frame, an FCP XRDY frame, or an FCP_RSP(Bad) status may require further interaction with software modules 106 and 110. Physical to virtual I/O error resolution module 106 is typically implemented as a software component of virtualized storage controller 100 and determines whether an FCP_RSP(Bad) status return may be retried. If so, module 106 interacts appropriately with virtual I/O processor 120 to retry the failed operation. I/O completion module 122 of virtual I/O processor 120 awaits the results of such a retried operation before communicating a final status to the requesting host 150. Virtual I/O context module 110 of virtualized storage controller 100 provides mapping information defining the relationship between the "front side" (e.g., host 150 and the controller 100 virtual target) and the "back side" (e.g., controller 100 as an initiator and a physical FC target 160.1 through 160.N). Specifically, the back side exchange provided to the target is the OX_ID and the front side exchange is the RX ID. When a frame arrives from the host 150, the RX ID is used as the index into the virtual I/O context module 110 to obtain the back side relationship and context for the physical FC target 160.1 through 160.N. In like manner, for frames received at the controller 100 from the physical FC target 160.1 through 160.N, the OX ID is used to obtain the relationship to front side host 150. The context contains routing information (inbound to outbound port) and exchange state that is used to fault the I/O or return good status to the Host (150).

In communications between virtual I/O processor 120 and the various software components (102 through 110) of virtualized storage controller 100, the starting ID ("main ID") of the allocated range of exchange IDs (M) may be utilized to identify the relationship among the plurality of dependent physical I/O operations. In other words, any exchange ID utilized in a physical I/O operation that ranges between a starting value of M and an ending value of the range (M+N−1) identifies the corresponding physical I/O operation as related to other dependent, asynchronous physical I/O operations utilizing exchange IDs in the same range. The utilization of these predefined ranges therefore simplifies processing of all the components within the virtualized storage controller 100 as they relate to the need for identifying the association among a plurality of asynchronous, dependent physical I/O operations. By contrast, prior techniques utilizing list and queue structures to associate all the exchange IDs utilized for a sequence of asynchronous, dependent physical I/O operations required substantial memory access to determine the relationship. Such access involved numerous memory accesses to list and queue structures to determine the relationship of one exchange ID to others in a group of related I/O operations.

In some embodiments, the exchange ID utilized in communicating responses to the requesting host 150 (i.e., the responder exchange ID "RX ID") may always be selected as the first exchange ID of the allocated range (i.e., M). In other exemplary embodiment where the enhanced features of virtual I/O processor 120 must coordinate with other existing (legacy) logic within the virtualized storage controller 100, it may be desirable to select a different exchange ID to be utilized for communications with the requesting host 150. Thus, a "primary" exchange ID may be selected from the allocated range of exchange IDs for purposes of communicating responses to the requesting host system 150. Primary exchange selection module 124 is therefore operable within virtual I/O processor 120 to provide logic for selecting an appropriate primary exchange ID based on responses received from the plurality of physical target devices 160.1 through 160.N. To permit such selection of a primary exchange ID (e.g., the RX ID) primary exchange selection module 124 may determine which exchange ID of the allocated range of sequential exchange IDs should be selected based on responses from the physical target devices. Thus, any received frames other than a successful completion status from the multiple physical FC target devices 160.1 two 160.N may be passed through a primary exchange selection module 124 of virtual I/O processor 120 to permit logic therein to select one of the range of allocated exchange IDs for communication with the host 150 and for compatibility with other logic and software with the virtualized storage controller 100.

Figure 2:
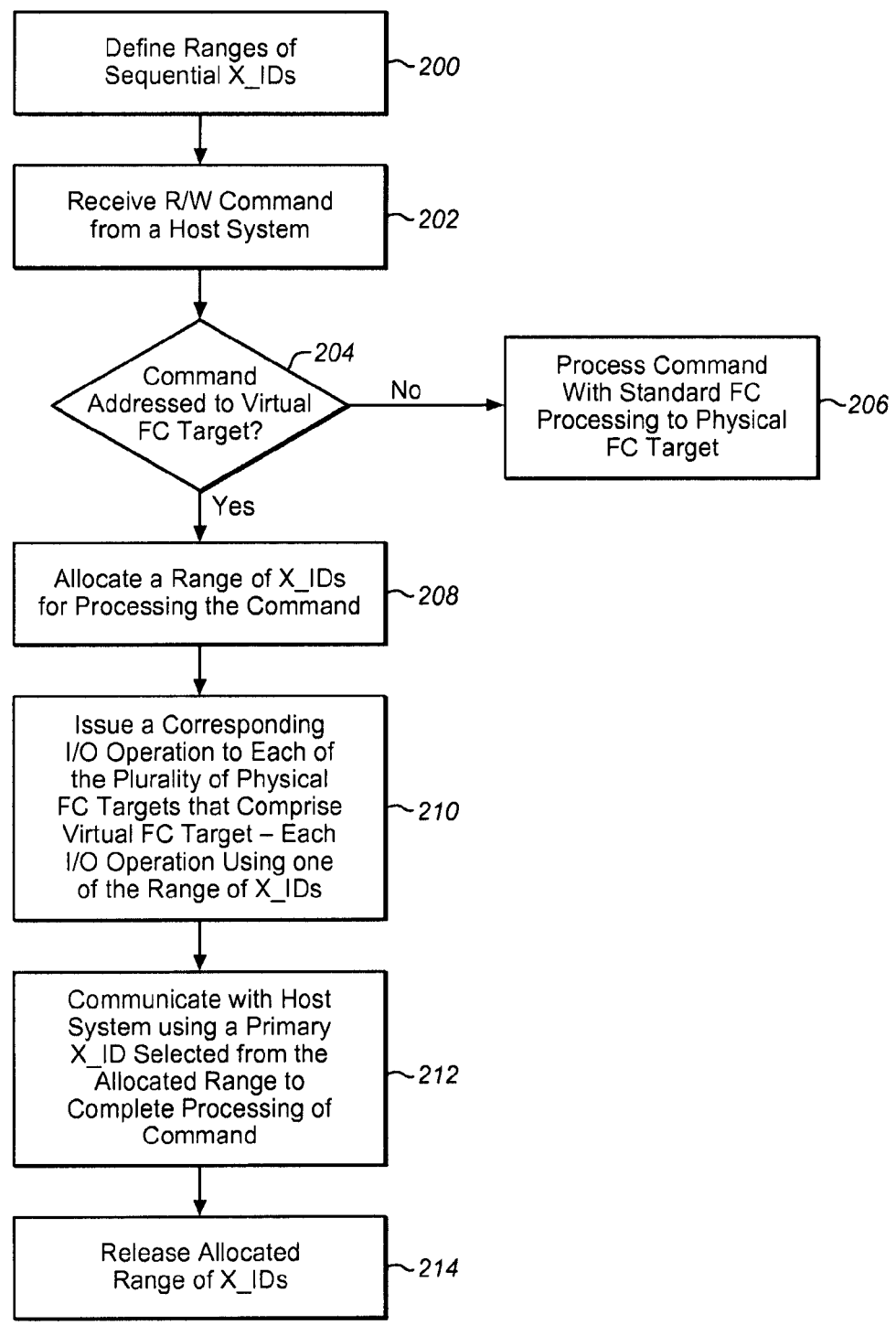
FIG. 2 is a flowchart describing an exemplary method in accordance with features and aspects hereof to improve management of exchange IDs used to associate multiple, asynchronous, dependent physical I/O operations associated with a virtual FC target.

FIG. 2 is a flowchart describing an exemplary method in accordance with features and aspects hereof to improve management of exchange IDs associated with multiple, asynchronous, dependent physical I/O operations in a virtualized storage system. The method of FIG. 2 may be operable in a virtualized storage system such as described above and FIG. 1. Step 200 represents initialization processing of the virtualized storage controller to allow definition of the ranges of sequential exchange IDs. In general, the number of exchange IDs allocated in each of the multiple ranges should be a number (N) greater than or equal to the maximum number of physical target devices that may comprise a virtual volume. In one preferred embodiment, the number of exchange IDs in each range should be a power of two to permit simplified processing for identifying related exchange IDs by use of bit field masking and shifting operations. In accordance with Fibre Channel standards, exchange IDs are represented by 16 bit unsigned values in the range between 0 and 65535. By way of example, if virtual volumes comprise no more than 6 physical storage devices, the number of exchange IDs in each range (N) may be eight (i.e., a power of two greater than or equal to the maximum number of physical target devices that may comprise a virtual target). In such an example, 8192 such ranges may be defined within the range of 16 bit unsigned values for exchange IDs. The first or main exchange ID (M) of each of these ranges would then be the set of numbers (0, 8, 16, 32, . . . and 65528).

Following initialization of the virtualized storage system, step 202 receives a read or write command from an attached host system (i.e. an initiator device coupled to the virtualized storage system). The received read or write command is addressed to some FC target address. Step 204 next determines whether the received read or write command is addressed to a virtual FC target or a physical FC target. If the received command is addressed to a physical FC target, step 206 represents all standard processing within the virtualized storage controller to process the received command with the identified physical FC target device. Such processing is well known to those of ordinary skill in the art and need not be further detailed here.

If step 204 determines that the received command is addressed to a virtual FC target, step 208 allocates a next available range of exchange IDs for processing of the received command. As noted elsewhere herein, the available ranges may be maintained in a simple queue or list structure such that the allocation processing the step 208 merely comprises "popping" or getting a next item from the list or queue. Step 210 then issues an appropriate physical I/O operation to each of the plurality of FC target devices that comprise the addressed virtual FC target. Each of the issued I/O operations uses a sequentially next one of the IDs in the allocated range of exchange IDs.

The issued physical I/O operations are then processed, substantially in parallel, by operation of each of the addressed physical FC target devices. Step 212 communicates a completion status to the host 150 using a selected primary exchange ID from the allocated range of IDs. A single response representative of the status of all the completed physical I/O operations is determined and communicated to the host system. For example, if all physical I/O operation completes successfully, a successful status response is returned to the requesting host system. By contrast, if any of the physical I/O operations complete with a failure status (after appropriate retry operations) a failure status is returned to the requesting host system. In communications with the requesting host system, a primary exchange ID is selected from the allocated range. As noted above, the primary exchange ID in some exemplary embodiment may simply be selected as the starting exchange ID (M) of the allocated range of exchange IDs. In other exemplary embodiments, any one of the exchange IDs in the allocated range may be selected as the primary exchange ID for purposes of communicating completion status to the requesting host system. Such a selection may be based on any suitable criteria as dictated by design choices in implementing features and aspects hereof.

Following communications with the host system indicating the success or failure of the received read or write command, the virtualized storage system releases the allocated range of exchange IDs at step 214. As noted above, a simple queue or list structure may be used to manage the allocation and release of ranges of exchange IDs. Thus, the processing of step 214 to release the presently allocated range of exchange IDs may comprise simply adding an entry back to the list or queue indicating that the allocated range is once again available.

Figure 3:
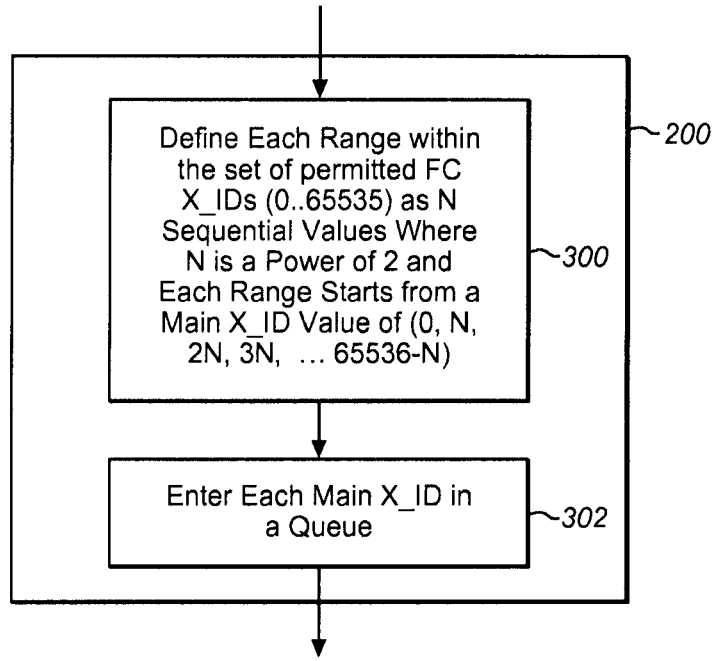
FIGS. 3 through 9 are flowcharts providing exemplary additional details of steps of the method of FIG. 2 in accordance with features and aspects hereof.

FIG. 3 is a flowchart providing exemplary additional details of the processing of step 200 of FIG. 2 to initialize the virtualized storage system by predefining multiple ranges of sequential exchange IDs. As noted above, in one exemplary embodiment, each range may comprise a range of sequential exchange ID values (ranging between 0 and 65535 in accordance with Fibre Channel standards). In one exemplary embodiment, N may be a power of two to permit simplified management of the logic to associate asynchronous dependent physical I/O operations. Utilizing a power of two value for N permits simple bit field shifting and masking logic to determine if the exchange ID utilized for any physical I/O operation is related to a particular range of exchange IDs (and thus relates to a particular virtual I/O request). Each such range starts from a main exchange ID value (M). Thus, in general, the main exchange ID value for each range is one of a set of values (0, N, 2N, 3N, . . . 65536−N). Step 302 then enters each predefined main exchange ID in a queue or list structure to permit allocation and de-allocation (release) of exchange IDs by simple "push" and "pop" list or queue operations.

Figure 4:
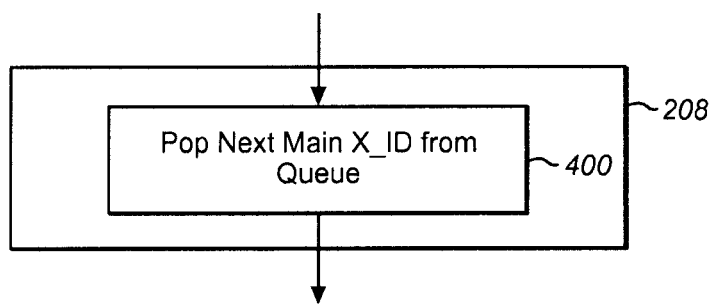
Figure 5:
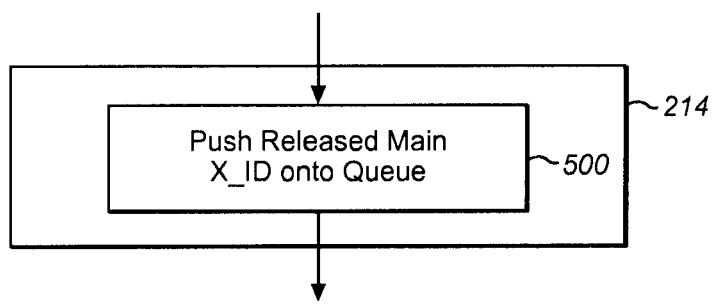

FIGS. 4 and 5 are flowcharts providing exemplary additional details of the functioning of steps 208 and 214 of FIG. 2 to allocated and release (de-allocate), respectively, a range of exchange IDs. As noted above, the available ranges of exchange IDs may be maintained as entries in a list or queue structure. Thus, step 400 of FIG. 4 provides exemplary additional detail of step 208 of FIG. 2 indicating that the allocation of a range of exchange ID values is performed by popping a next entry off the list or queue of available ranges. The entry so popped provides a main exchange ID (M) such that the values M through M+N−1 may be utilized for dependent, asynchronous, physical I/O operations to process a command directed to a virtual FC target. In like manner, step 500 of FIG. 5 provides exemplary additional detail of step 214 of FIG. 2 indicating that de-allocation (release) of a range of exchange ID values is performed by simply pushing a new entry onto the list or queue of available ranges. As above, the pushed entry indicates the main ID of the range of IDs to be de-allocated or released. Thus, the range of exchange ID values from M through M+N−1 is released and available for reallocation. Those of ordinary skill in the art will readily recognize numerous other embodiments and structures for managing the availability of ranges of exchange IDs. Thus, the list or queue structure and push/pop operations described above with respect to FIG. 3 through 5 are intended merely as exemplary of one possible embodiment. Numerous other embodiments will be readily recognized by those working skill in the art as a matter of design choice.

Figure 6:
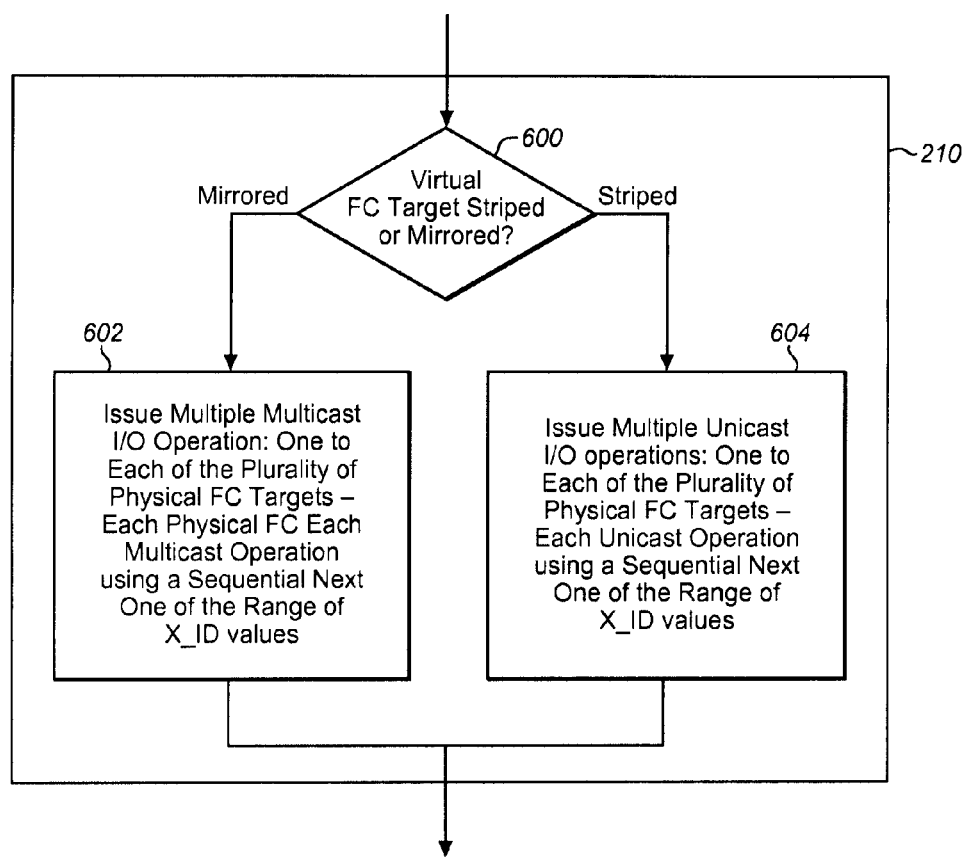

FIG. 6 is a flowchart describing exemplary additional details of the processing of step 210 of FIG. 2 to issue multiple physical I/O operations to appropriate physical FC target devices to effectuate the reading or writing of data from an identified virtual FC target. A virtual FC target (e.g., a virtual volume) may be either mirrored or striped. As well known to those of ordinary skill in the art, a mirrored volume duplicates the same data on multiple devices. A striped volume distributes portions of data over multiple target devices. Thus, FC physical I/O operations to perform reads or writes on a mirrored virtual FC target may utilize multicast FC physical I/O operations while a striped FC virtual target command may utilize unicast FC physical I/O operations. The multiple multicast physical I/O operations are essentially all identical but for the identity of the particular physical FC target and the exchange ID utilized by each multicast physical I/O operation. The multiple unicast physical I/O operations also each identify a particular physical FC target and utilize the corresponding exchange ID within the range of allocated exchange IDs but typically identify different physical data addresses and provide different data in the context of a write operation.

Step 600 of FIG. 6 therefore first determines whether the virtual FC target is a striped volume or a mirrored volume. If the virtual FC target is a mirrored volume, step 602 issues multiple multicast physical I/O operations—one to each of the plurality of physical FC targets that comprise the identified virtual FC target. Each of the multiple multicast I/O operations uses a corresponding originator exchange ID (OX ID) of the range of allocated exchange IDs. In step 600 determines that the virtual FC target identified in the read or write command of the requesting host is a striped volume, step 604 is operable to issue multiple unicast I/O operations. Each of the multiple unicast physical I/O operations is addressed to a corresponding physical FC target and each utilizes one of the exchange ID values in the allocated range as its OX ID.

Figure 7:
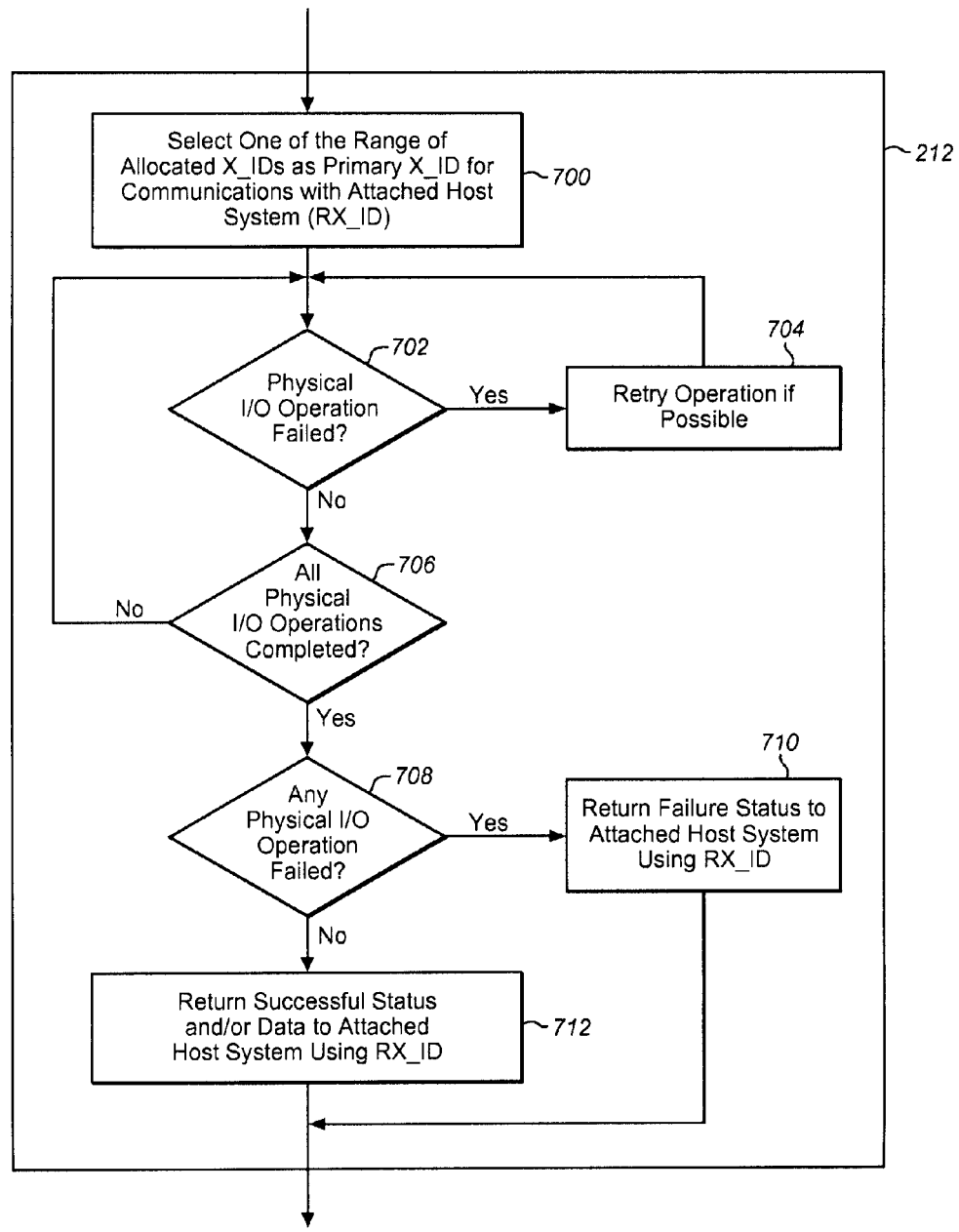

As noted above when communicating responses to the requesting host system, a primary exchange ID from the allocated range of exchange IDs is utilized for all communications with the requesting host system. FIG. 7 provides exemplary additional details of one exemplary embodiment for communications with the host system as described above in step 212 FIG. 2. Step 700 first selects one of the exchange IDs from the allocated range for use as the primary exchange ID in communications with the requesting host system. Having so selected the primary exchange ID, steps 702 through 706 are iteratively operable until all physical I/O operations have completed—with either success or failure. Step 702 first detects whether a just completed physical I/O operation has failed and, if so, step 704 is operable, if possible, to retry failed operation. If no retry or additional retries are feasible or required, the I/O operation is simply completed with a failed status. If step 702 determines that the just completed physical I/O operation succeeded, step 706 is next operable to determine if all of the dependent physical I/O operations corresponding to the host read or write command have been completed (completed with either failure or success). If not, processing continues looping back to step 702 until all related, dependent, asynchronous physical I/O operations have completed. When all physical I/O operations are completed, step 708 next determines whether any one or more of the dependent, asynchronous physical I/O operations completed with a failure. If so, step 710 returns a failure status to the requesting host systems using the previously selected primary exchange ID. If step 708 determines that all dependent, asynchronous physical I/O operations completed successfully, step 712 returns a successful status (and/or requested data in the context of a read command) to the requesting host system utilizing the previously selected primary exchange ID.

As noted above, in some embodiments the enhanced features and aspects hereof may be integrated with existing design choices for other components of the virtualized storage system. In such cases, the selection of a primary exchange ID may need to be coordinated with the other existing logic and software within the enhanced virtualized storage system. For example, selection of the primary exchange ID may be determined based on the first response received from any of the physical FC target devices asynchronously performing corresponding physical I/O operations in parallel. If a first responding physical FC target device indicates successful completion/progress of its physical I/O operation, certain related logic and software within the enhanced virtualized storage system may require that the exchange ID of that first physical I/O operation to respond be utilized for all logic associated with the multiple, dependent, asynchronous physical I/O operations.

Figure 8:
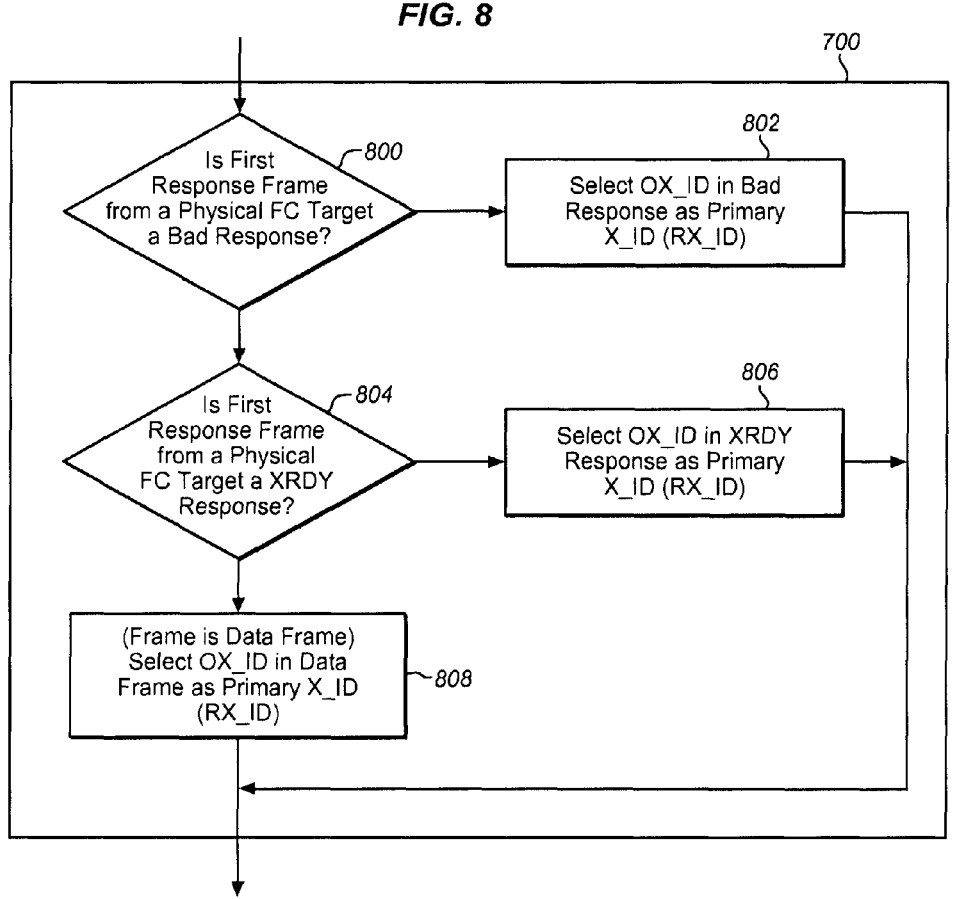

FIG. 8 is a flowchart providing exemplary additional details of the processing of step 700 of FIG. 7 in accordance with one embodiment hereof where other legacy logic is present that relies on certain selections of the primary XID (RX_ID) for its continued processing of the original I/O request from the host. Step 800 first determines whether the first response is a bad response (i.e., an error indication from a physical FC target in response to its physical I/O operation). If so, step 802 selects the X_ID (OX ID) in that received bad response as the primary X_ID (RX_ID) to be used in all related logic and exchanges with the initiator (host). Otherwise, step 804 determines whether the first received response from a physical FC target is an transmit ready (XRDY) response. If so, step 806 selects the OX ID in that XRDY response as the primary XID (RX ID) for all further exchanges with the initiator and other related logic. Otherwise, the first response is a data frame (e.g., responsive to a successful read physical I/O operation). Step 808 therefore selects the OX ID of the data frame response as the primary X_ID (RX_ID) for further exchanges with the initiator and in other related logic.

Figure 9:
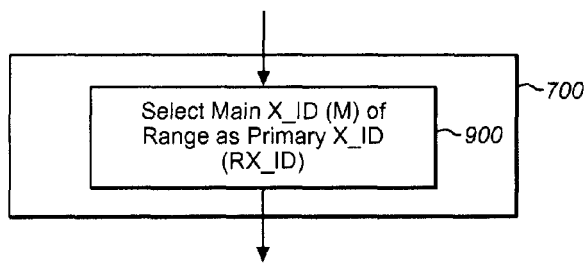

In other embodiments where the enhanced features and aspects hereof need not integrate with existing, legacy logic and circuits, simpler logic may be employed for selecting a primary exchange ID. FIG. 9 is a flowchart providing exemplary additional details of step 700 of FIG. 7 to select a primary exchange ID in accordance with such other embodiments. Step 900 simply selects the main exchange ID (M) of the allocated range of exchange IDs as the primary exchange ID for all further communications with the requesting host system.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method comprising:
receiving, by a storage system, a data command from a host system, wherein the data command is directed to a virtual device of the storage system, and wherein the virtual device comprises a plurality of physical devices of the storage system;
allocating a range of exchange identifier values to the data command;
issuing a plurality of I/O operations corresponding to the data command, each of the plurality of I/O operations directed to a physical device of the plurality of physical devices of the storage system, wherein the plurality of I/O operations are performed substantially in parallel; and
associating an exchange identifier within the range of exchange identifier values with each of the plurality of I/O operations.

2. The method of claim 1, wherein the range of exchange identifier values includes a predefined number of exchange identifiers, the predefined number determined prior to the receiving of the data command from the host system.

3. The method of claim 2, wherein the predefined number is greater than or equal to a maximum number of physical devices per virtual target.

4. The method of claim 2, wherein the predefined number is a power of 2.

5. The method of claim 1, further comprising:
selecting a primary exchange identifier corresponding to the data command; and
transmitting a response to the host system using the primary exchange identifier, the response communicating a status of the plurality of I/O operations.

6. The method of claim 5, wherein the selected primary exchange identifier corresponds to an exchange identifier associated with an I/O operation of the plurality of I/O operations.

7. The method of claim 6, wherein the selected primary exchange identifier is selected based on the I/O operation generating an error.

8. The method of claim 1, wherein the virtual device is a mirrored virtual device, and wherein the plurality of I/O operations includes a plurality of multicast physical I/O operations.

9. The method of claim 1, wherein the virtual device is a striped virtual device, and wherein the plurality of I/O operations includes a plurality of unicast physical I/O operations.

10. A storage controller comprising:
a first host bus adapter communicatively coupled to a host device and operable to receive a data command from the host device;
a second host bus adapter communicatively coupled to a plurality of physical storage devices;
a virtual I/O processor communicatively coupled to the first host bus adapter and the second host bus adapter, the virtual I/O processor operable to:
receive the data command from the first host bus adapter;
determine whether the data command addresses a virtual target device; and
when it is determined that the data command addresses the virtual target device:
allocate a range of exchange identifier values to the data command;
generate a plurality of I/O operations corresponding to the data command;
associate an exchange identifier from the range of exchange identifier values to each of the plurality of I/O operations; and
issue the plurality of I/O operations to the plurality of physical storage devices via the second host bus adapters, wherein the I/O operations are to be performed substantially in parallel.

11. The storage controller of claim 10, wherein the first host bus adapter and the second host bus adapter are a same host bus adapter.

12. The storage controller of claim 10, wherein each of the plurality of I/O operations is directed to a physical storage device of the plurality of physical storage devices.

13. The storage controller of claim 10, wherein the virtual I/O processor is further operable to determine a plurality of predefined exchange identifier ranges including the range of exchange identifier values allocated to the data command, wherein the plurality of predefined exchange identifier ranges are determined prior to the receiving of the data command from the first host bus adapter.

14. The storage controller of claim 10, wherein the allocated range of exchange identifier values includes a number of exchange identifier values greater than or equal to a maximum number of physical devices per virtual device of the storage controller.

15. The storage controller of claim 10, wherein the virtual I/O processor is further operable to:
   allocate a primary exchange identifier to the data command; and
   transmit a response to the host device via the first host bus adapter using the primary exchange identifier, the response containing a status of the plurality of I/O operations.

16. The storage controller of claim 15, wherein the primary exchange identifier corresponds to an exchange identifier associated with a selected I/O operation of the plurality of I/O operations, and wherein the selected I/O operation is selected based on the I/O operation generating an error.

17. A non-transitory computer readable storage medium having instructions that, when executed by a computing device, cause the computing device to:
   determine a plurality of predefined ranges of exchange identifiers;
   receive, from a host system, a data command directed to a virtual device, wherein the virtual device comprises a plurality of physical devices;
   allocate to the data command a range of exchange identifiers from the plurality of predefined ranges of exchange identifiers;
   determine a plurality of I/O operations for the data command;
   associate an exchange identifier from the range of exchange of identifiers to each of the plurality of I/O operations; and
   issue the plurality of I/O operations to the plurality of physical devices, wherein the plurality of I/O operations are to be performed substantially in parallel.

18. The storage medium of claim 17 having further instructions that cause the computing device to:
   determine a primary exchange identifier for the data command based on an I/O operation of the plurality of I/O operations producing an error.

19. The storage medium of claim 17, wherein each of the plurality of predefined ranges of exchange identifiers includes a predefined number of exchange identifiers.

20. The storage medium of claim 19, wherein the predefined number of exchange identifiers represents a maximum number of physical devices per virtual device.

* * * * *